(12) United States Patent
Jensen et al.

(10) Patent No.: US 10,455,828 B2
(45) Date of Patent: Oct. 29, 2019

(54) METHOD FOR MONITORING ONE OR MORE PEST TRAPS, SUCH AS RAT TRAPS

(71) Applicant: CB Svendsen A/S, Vasrlose (DK)

(72) Inventors: Morten F. Jensen, Hvidovre (DK); Daniel B. Hansen, Holbæk (DK)

(73) Assignee: CB Svendsen A/S, Vasrlose (DK)

( * ) Notice: Subject to any disclaimer, the term of this patent is extended or adjusted under 35 U.S.C. 154(b) by 0 days.

(21) Appl. No.: 15/757,598

(22) PCT Filed: Aug. 25, 2016

(86) PCT No.: PCT/DK2016/000030
§ 371 (c)(1),
(2) Date: Mar. 5, 2018

(87) PCT Pub. No.: WO2017/036480
PCT Pub. Date: Mar. 9, 2017

(65) Prior Publication Data
US 2018/0249698 A1   Sep. 6, 2018

(30) Foreign Application Priority Data

Aug. 31, 2015  (DK) .............................. 2015 00118 U
Feb. 29, 2016  (DK) ................................ 2016 00123

(51) Int. Cl.
| G08B 23/00 | (2006.01) |
| A01M 23/24 | (2006.01) |
| A01M 23/30 | (2006.01) |
| G08B 21/18 | (2006.01) |

(52) U.S. Cl.
CPC .......... *A01M 23/245* (2013.01); *A01M 23/24* (2013.01); *A01M 23/30* (2013.01); *G08B 21/18* (2013.01)

(58) Field of Classification Search
CPC .. A01M 23/245; A01M 23/30; A01M 31/002; G08B 21/18
USPC ....................................................... 340/573.2
See application file for complete search history.

(56) References Cited

U.S. PATENT DOCUMENTS

| 4,665,644 A * | 5/1987 | Vajs ........................ A01M 23/30 |
| | | 43/82 |
| 5,184,416 A | 2/1993 | Brewer |
| 6,415,544 B1 * | 7/2002 | Leyerle ................. A01M 23/24 |
| | | 43/82 |

(Continued)

FOREIGN PATENT DOCUMENTS

| WO | 02/100170 A2 | 12/2002 |
| WO | 2007/026123 A1 | 3/2007 |

*Primary Examiner* — Naomi J Small
(74) *Attorney, Agent, or Firm* — Fox Rothschild LLP; Carol E. Thorstad-Forsyth

(57) ABSTRACT

A method for monitoring whether a number of a rat traps have been activated, where each tap has a moveable part, a fixed part, a switch and a signaling device, such than when the moveable part is moved towards the fixed part then the signaling device transmit a signal to a user's smartphone having a display on which display the user is informed whether a rat has gone into the trap. An opening size between the moveable part and the fixe part is detected indicating whether a rat, a mouse or a false alarm is detected. By the invention a beneficial and accurate way of monitoring the status rat traps are obtained.

13 Claims, 3 Drawing Sheets

(56) References Cited

U.S. PATENT DOCUMENTS

Figure 1:
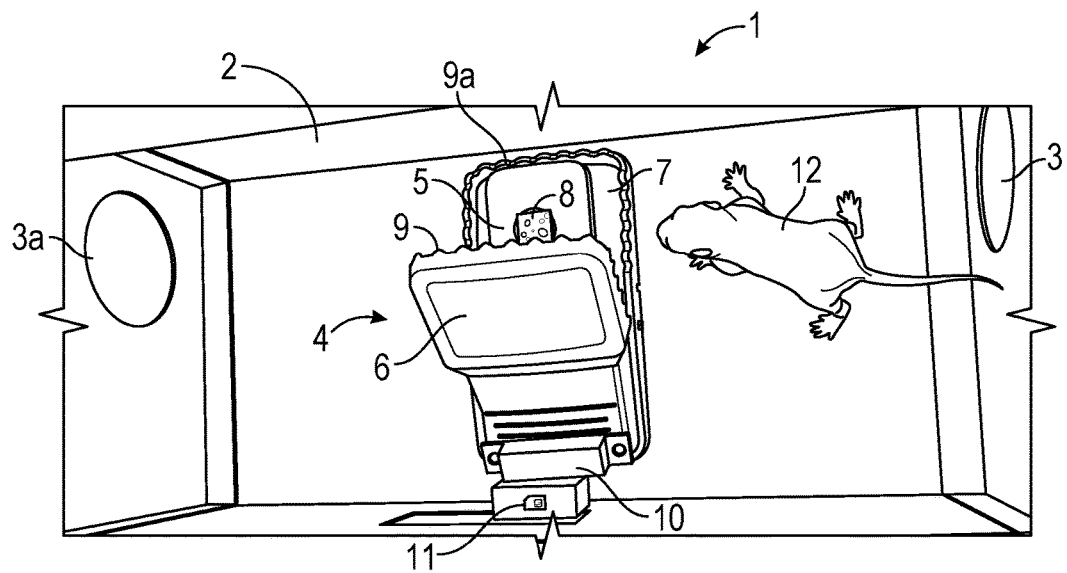

| | | | |
|---|---|---|---|
| 6,865,843 B1 * | 3/2005 | Jordan, Sr. | A01M 23/12 |
| | | | 43/139 |
| 8,520,072 B1 * | 8/2013 | Slavin | G08B 13/19684 |
| | | | 348/143 |
| 8,943,741 B2 * | 2/2015 | Watson | A01M 23/30 |
| | | | 43/81 |
| 9,258,990 B1 | 2/2016 | Harvey et al. | |
| 2002/0184811 A1 | 12/2002 | Wright | |
| 2005/0151653 A1 * | 7/2005 | Chan | A01M 31/002 |
| | | | 340/573.2 |
| 2008/0204253 A1 * | 8/2008 | Cottee | A01M 23/245 |
| | | | 340/573.2 |
| 2009/0193707 A1 * | 8/2009 | Moran | A01M 23/16 |
| | | | 43/58 |
| 2013/0342344 A1 | 12/2013 | Kramer et al. | |
| 2014/0279600 A1 * | 9/2014 | Chait | G06Q 30/018 |
| | | | 705/317 |
| 2018/0199565 A1 * | 7/2018 | Zosimadis | H04W 4/00 |

\* cited by examiner

METHOD FOR MONITORING ONE OR MORE PEST TRAPS, SUCH AS RAT TRAPS

This application is the U.S. national phase application of PCT International Application No. PCT/DK2016/000030 filed Aug. 25, 2016, which claims priority to Danish Patent Application No. BA 2015 00118 filed Aug. 31, 2015 and Danish Patent Application No. PA 2016 00123 filed Feb. 29, 2016, the contents of such applications being incorporated herein by reference.

The invention relates to a method for monitoring whether one or more pet traps amongst a plurality of traps in an area are activated.

Such a method is disclosed in WO 2007/026123 A1.

According to this publication a number of traps are able to transmit signals to a base station that in turn transmit signals to a base station that in turn transmit a message to a cellular phone.

On this basis it is a purpose with the invention to get an easier, quick and more reliable way to monitor the status of traps.

The purpose is fulfilled with a method defined in the claims, i.e. with a method for monitoring whether one or more pest traps, such as rat traps, are activated, said traps having a moveable part and a fixed part, between which an opening is defined and in which a step part is arranged, and where each trap has a switch that is connectable to a signaling device such that when the moveable part is moved towards the fixed part, then the signaling device transmit a signal to a user's communication unit, said communication unit has a display that in turn shows whether the moveable part has been moved, such that the user on the display can be informed about whether the moveable part has been moved and a rat has gone into the trap.

In order to get even more accurate operation of the method according to the invention is advantageous if that the signaling device transmit geographical positions signals, such as GPS signals, of the rat traps to the user and that an overview of the number of rats that are gone into one or more of the traps are shown on the display, that the display shows to the user a sequence of those places that are nearest the user's communication unit and that the communication unit is a smartphone, such as an IPhone, an IPad or the like.

In case that many traps should be survived it is expedient that the user from his communication unit can transmit information to other user's about the status of the rat traps.

In order to get even more exact status of rat traps it is expedient, if the opening between the moveable part and the fixed part in the rat trap is detected and that the size of the opening is determined as the angle between the moveable part and the fixed part.

A practical way to implement the method in detecting the opening is that a flexible arm is arranged in the opening where the arm is adapted to registration the size of the opening, when the step pad is activated, and that on the flexible part a number of electrical contact points is arranged that during the movement of the moveable part is adapted to create contact with a number of electrical points, that are arranged on a bar inside the fixed part.

Figure 2:
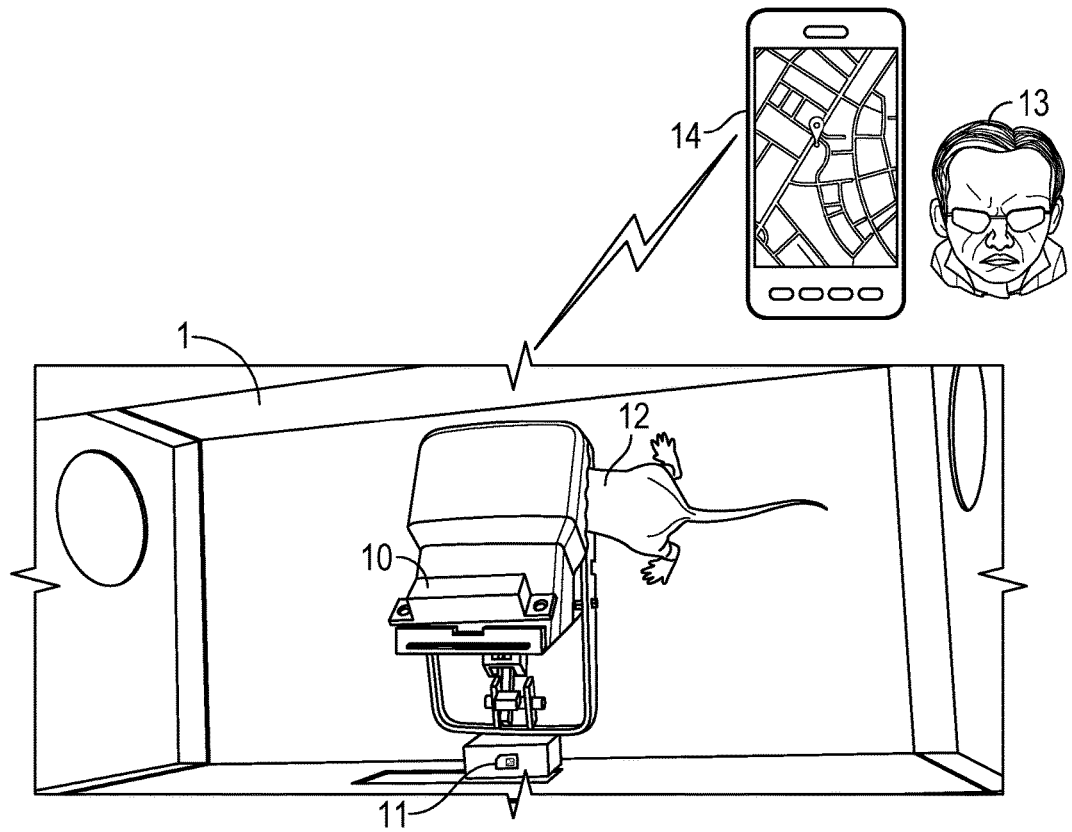
Figure 3:
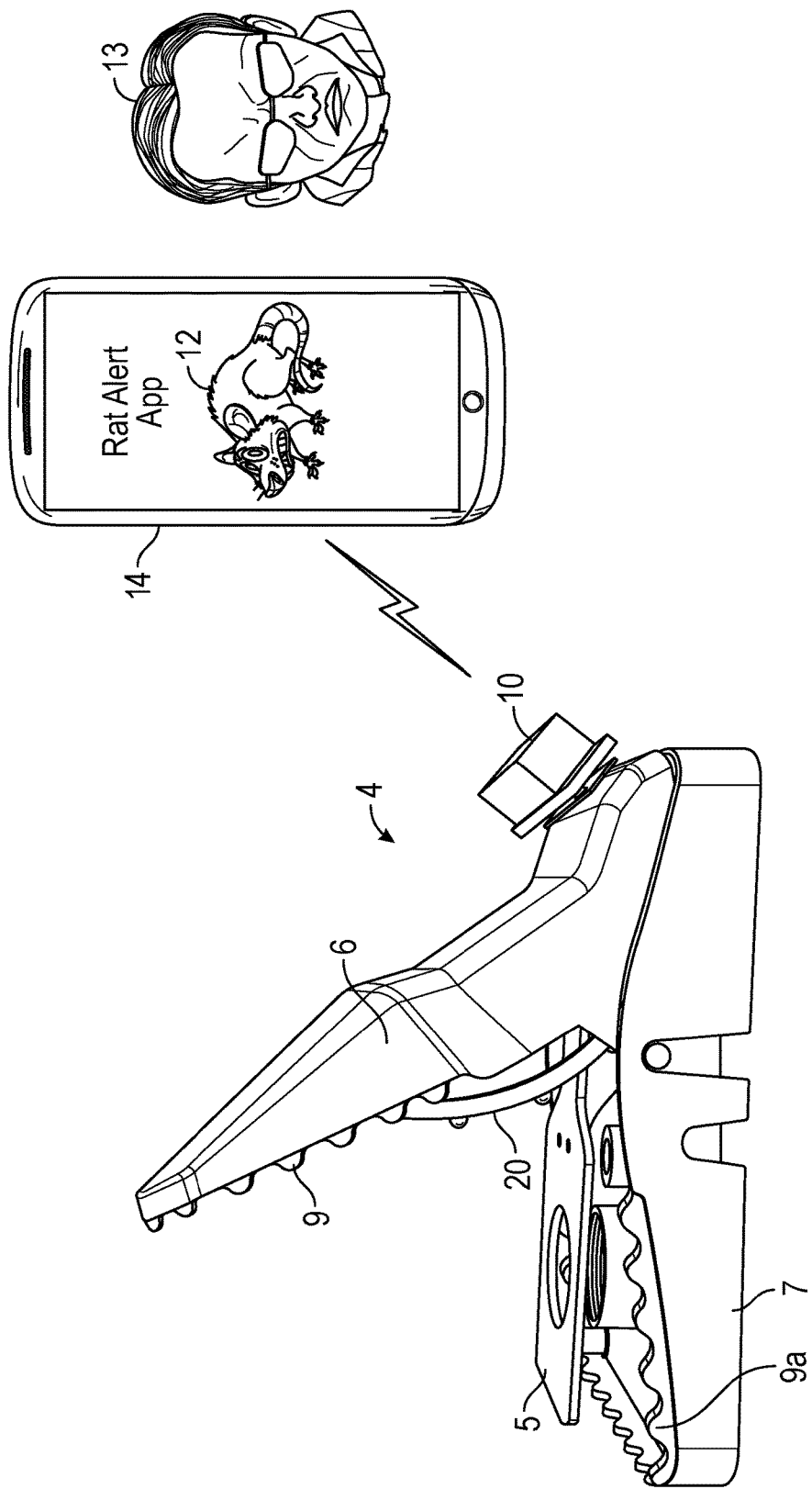

The invention will now be explained in connection under reference to the accompanying drawing on which FIG. 1 shows an arrangement according to the invention with an installed rat trap before the rat is caught in the rat trap, FIG. 2 shows the rat trap on FIG. 1, but now with a rat, that is caught in the rat trap FIG. 3 shows a rat trap according to an embodiment of the invention, whereas FIG. 4 seen from the side the rat trap on FIG. 3 more detailed, On FIG. 1, 1 denotes a rat trap in itch entity, that consists of a box, normally of metal. The box has two holes 3, 3a giving access for a rat 12.

Inside the box a step part 5 is placed, on which a piece of cheese 8 for the rat 12 can be placed. The step part is arranged between a moveable part 6 and a fixed part 7.

Teeth designated 9 are arranged on the moveable part 6, whereas 9a designates teeth on the fixed part 7. Such a rap trap is well known. It operates such that when a rat touches the step part 5, the moveable part 6 will move towards the fixed part 7 and take the on FIG. 2 shown position where the rat 12 is caught.

11 designates a signal transmitter that is in electrical contact with a switch 10. As soon the switch 10 is moved from that on FIG. 1 shown position to that on FIG. 2 shown, the signal transmitter will transmit a signal to a communication unit, here shown as a smartphone 14.

The whole arrangement works such that the user of the smartphone can receive a number of signals from various rat traps, said signals being ordered in a sequence and shown on the display of the smartphone. All signals can be handled with GPS signals such that the user can plan in what sequence the signals and thereby the traps shall be treated.

It is also possible to transmit signals to other user's smartphones, f. inst. In connection with a subscription where the user receives a fee for transmitting signals to other users.

Now an embodiment of the rat trap according to FIG. 3 and FIG. 4 will be explained.

On FIG. 3, the rat trap 4, having the moveable part 6 with teeth 9 is shown, said moveable part can be moved towards the fixed part 7 having the teeth 9a. The step part 5 is adapted to activate the moveable part 6 towards the fixed part 7, when for instance a rat touches the step part 5. The moveable part 6 is connected to a not shown spring, that gets the moveable part to move towards the fixed part when the step part 5 is touched.

Further, on FIG. 3, 20 denotes a flexible arm, the function of which will be explained in connection with FIG. 4.

Figure 4:
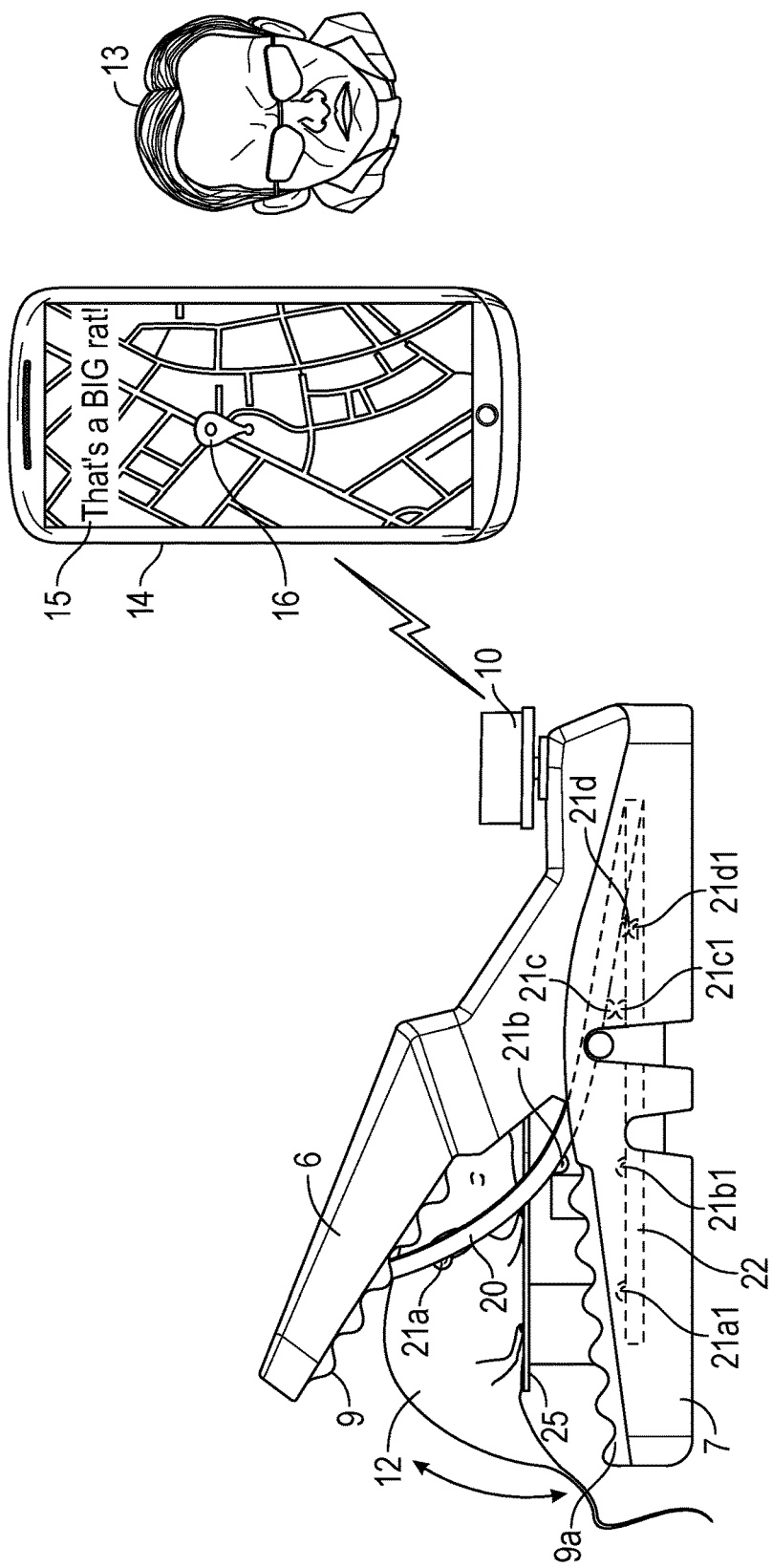

As it can be seen on FIG. 4 a rat 12 has entered the step part 5, what results in that the moveable part 6 moves towards the fixed part 7, until it catches the rat 12 of a certain size.

The size of the rat will correspond to the size of the opening or the angle between the moveable part 6 and the fixed part 7. The flexible arm 20 is shown with electrical points 21a, 21b, 21c, 21d intended to create electrical contacts with electrical points 21a1, 21b1, 21c1, 21d1 on a fixed bar 22. As it can be seen the points 21c, 21c1 is on the way to create contact, indicating the size of the rat 12. If a mouse was caught in the rat trap it could be the points 21b, 21 b1 that create contact. The points 21d, 21d1 indicates an open tap, while the points 21d, 21d1 indicates a closed trap, corresponding to a false alarm.

The information provided by one or more of the pairs of points 21a to 21b1 can, via the switch 10, be shown on the rat catcher's IPhone 14, where a position 16 of the rat trap is shown and in case a big rat is caught, as shown as a message 15.

The invention claimed is:

1. A method for monitoring when a pest trap is activated, said pest trap having (A) a moveable part and a fixed part between which an opening is defined and a step part is arranged, and (B) a switch connectable to a signalling device, the method comprising:
when the moveable part is moved towards the fixed part, performing the following operations by the pest trap:
detecting an angle between the movable part and the fixed part;
causing information to be displayed by a remote communication unit which indicates that (a) the moveable part has been moved and a rat has gone into the pest trap and (b) the rat has a particular size corresponding to the angle.

2. A method according to claim 1, further comprising transmitting from the signalling device a geographical positions signal of the pest trap to the remote communication unit.

3. A method according to claim 1, further comprising performing operations by the rat trap to cause an overview of the number of rats that have gone into one or more of the pest traps to be displayed by the remote communication unit.

4. A method according to claim 1, further comprising performing operations by the remote communication device to display a sequence of locations where rat traps reside that are nearest to the remote communication unit.

5. A method according to claim 1, wherein the remote communication unit comprises a smartphone.

6. A method according to claim 1, further comprising transmitting from the remote communication unit information to other communication units that indicates a status of the pest trap.

7. A method according to claim 1, wherein a flexible arm is arranged in the opening and is adapted to register a size of the opening when a step pad is activated.

8. A method according to claim 1, wherein the angle is detected using a flexible part on which structural members are arranged so as to respectively come closer to and align with structural members that are arranged on a bar inside the fixed part when the movable part is moved towards the fixed part.

9. System for trapping pest animals, comprising:
one or more traps each comprising a movable part and a fixed part;
wherein each trap of said one or more traps can assume the following two positions:
a first open position in which the pest animal after touching the trap brings the trap to a second closed position;
the second closed position in which the pest animal is trapped in the trap and subsequently can be removed by a pest controller;
wherein each trap of said one or more traps performs the following operations when the trap is transitioned from the first open position to the second closed position:
detecting an angle between the movable part and the fixed part at least when said trap is in the second closed position; and
causing information to be displayed by a communication device of the pest controller which indicates that (a) the trap has been transitioned into the second position and (b) the pest animal has a particular size corresponding to the angle.

10. The system according to claim 9, wherein information about locations of the one or more traps is also caused to be displayed by the communication device.

11. The system according to claim 9, wherein the communication device provides continuous information about a number of pest animals trapped.

12. The system according to claim 9, wherein the communication device comprises a cellular phone, a smartphone, or a tablet computer.

13. The system according to claim 9, wherein a signaling unit is provided with each trap of the one or more traps that comprises a GSM module registered with an independent telecoms provider via a SIM-card.

* * * * *